United States Patent [19]
Hayashi et al.

[11] Patent Number: 5,237,417
[45] Date of Patent: Aug. 17, 1993

[54] APPARATUS FOR DISPLAYING TELEVISION RECEIVER OPERATIONAL PARAMETERS IN A SEPARATE AREA OF THE SCREEN

[75] Inventors: Toshihide Hayashi; Kenji Fujisawa, both of Kanagawa; Satoshi Teramoto, Tokyo, all of Japan

[73] Assignee: Sony Corporation, Tokyo, Japan

[21] Appl. No.: 662,455

[22] Filed: Feb. 28, 1991

[30] Foreign Application Priority Data

Mar. 2, 1990 [JP] Japan ................................. 2-49638

[51] Int. Cl.$^5$ .............................................. H04N 5/45
[52] U.S. Cl. .................................. 358/183; 358/194.1; 358/192.1; 358/22
[58] Field of Search ............... 358/183, 22 PIP, 191.1, 358/194.1, 192.1

[56] References Cited
U.S. PATENT DOCUMENTS

| 4,214,273 | 7/1980 | Brown | 358/192.1 |
| 4,959,719 | 9/1990 | Strubbe | 358/183 |
| 4,965,557 | 10/1990 | Schepers | 358/194.1 |
| 4,992,782 | 2/1991 | Sakamoto | 358/183 |
| 5,008,750 | 4/1991 | Gomikawa | 358/183 |

FOREIGN PATENT DOCUMENTS

| 2432600 | 1/1976 | Fed. Rep. of Germany . |
| 61-194982 | 8/1986 | Japan . |
| 61-194984 | 8/1986 | Japan . |
| 0070183 | 3/1990 | Japan . |

Primary Examiner—James J. Groody
Assistant Examiner—Sherrie Hsia
Attorney, Agent, or Firm—Jay H. Maioli; Lewis H. Eslinger

[57] ABSTRACT

A television receiver includes a display control device for providing, in a portion of a main screen area adapted for displaying an image for input video signals, a subsidiary screen area adapted for displaying other images than the image by input video signals, and a character signal generator for generating character signals on the basis of control data. The character signals from the character signal generator are supplied to the display control device for displaying the control data on the subsidiary screen area to display a variety of the control data on the subsidiary screen area of the television receiver without obstructing its main screen area to improve operability of the television receiver.

6 Claims, 4 Drawing Sheets

APPARATUS FOR DISPLAYING TELEVISION RECEIVER OPERATIONAL PARAMETERS IN A SEPARATE AREA OF THE SCREEN

BACKGROUND OF THE INVENTION

1. Field of the Invention

This invention relates to a television receiver and, more particularly, to a television receiver in which character signals are generated by a character signal generating circuit on the basis of control data and supplied to display control means adapted for displaying the control data in a subsidiary screen area provided in a portion of or adjacent to a main screen area in which an image by input video signals is displayed.

2. Description of the Prior Art

In a television receiver, adjustment or setting of the following parameters, by way of example, may be made with the aid of a commander of an operating section or a remote control operation command unit on the front surface of the television receiver:
i) channel switching;
ii) sound volume;
iii) color hue;
iv) saturation;
v) brightness (luminance);
vi) sharpness;
vii) high frequency sounds;
viii) low frequency sounds; and
ix) sound volume balancing of left and right speakers.

According to the conventional practice in making adjustments in these parameters, the operator selects the parameter desired to be adjusted by means of a commander. Then, letters or characters 40, indicative of the selected adjustment parameter, such as the color hue, and a number of level bars 41, indicative of the current setting value of the selected parameter, are then displayed, as an aid or guidance to the adjustment operation, in a lower region of a viewing screen 42, by a superimpose function. The operator then performs an adjustment operation, while checking or monitoring the state of the level bars 41 and the quality of the picture displayed on the screen 42, until the desired picture quality is achieved.

Such display of the setting level at the lower zone of the viewing screen 42 by the above mentioned superimpose function is inconvenient in that only one selected item can be displayed at a time while the setting levels of the remaining adjustment items cannot be viewed simultaneously.

When setting levels of all of the adjustment parameters are displayed simultaneously by the superimpose function, the level bars 46 indicating the setting levels are displayed over the entire screen 45, as shown in FIG. 2, making it difficult for the operator to observe the picture quality on the viewing screen 45.

Most of the recent television receivers are provided with various special functions, including a program presenting function, according to which the time and channel of a desired broadcasting program are preset and the power source of the television receiver is turned on at exactly the preset time and the channel is set to the preset channel, or a program presetting and recording function, according to which a video tape recorder (VTR) is operatively linked with the television receiver to record the preset broadcasting program during the preset time. However, with an increase in the number of special functions, it becomes necessary for the user to become familiar with a large number of these functions, including the sequence of the operations for each of these functions with the result that the user forgets how to operate the various functions of the television receiver.

OBJECTS AND SUMMARY OF THE INVENTION

It is a principal object of the present invention to provide a television receiver free from the above mentioned problems of the conventional television receiver.

It is another object of the present invention to provide a television receiver in which various control data, such as current setting levels of a plurality of adjustment parameters, may be displayed simultaneously on a subsidiary screen area provided in a portion of or adjacent to the main screen area in which an image by the input video signals is displayed.

It is a further object of the present invention to provide a television receiver in which a plurality of adjustment parameters may be adjusted while the setting levels for the adjustment parameters appear on the screen and the picture quality of the image formed on the main screen area can be checked on the screen.

It is a further object of the present invention to provide a television receiver in which the messages such as the messages concerning the operating method or sequence may be displayed on the subsidiary screen area for improving the operability of the television receiver.

A television receiver according to the present invention comprises display control means for providing, in a portion of a main screen area adapted for displaying an image by input video signals, a subsidiary screen area adapted for displaying an image other than the image generated by the input video signals, and character signal generating means for generating character signals on the basis of control data, wherein the character signals from the character signal generating means are supplied to the display control means for displaying the control data on the subsidiary screen area.

With the television receiver according to the present invention, character signals are generated in character signal generating means on the basis of control data and are supplied to display control means adapted for providing in a portion of a main screen area displaying the image by input video signals, a subsidiary screen area displaying other images than the image generated by the input video signals, thereby enabling a variety of control data to be displayed on the subsidiary screen area. In addition, by displaying the current setting level of various picture quality parameter, such as luminance, as the control data on the subsidiary screen area, adjustment for the selected adjustment item may be made while the current setting level and the picture quality of the image on the main screen area are simultaneously monitored on the screen. In addition, the setting levels for a plurality of adjustment parameters, such as hue, saturation or luminance, may be simultaneously display without obstruction of the main screen area.

The above and other objects, features and advantages of the present invention will become more apparent from the following description especially when read in conjunction will the accompanying drawings.

DETAILED DESCRIPTION OF THE PREFERRED EMBODIMENT

Figure 1:
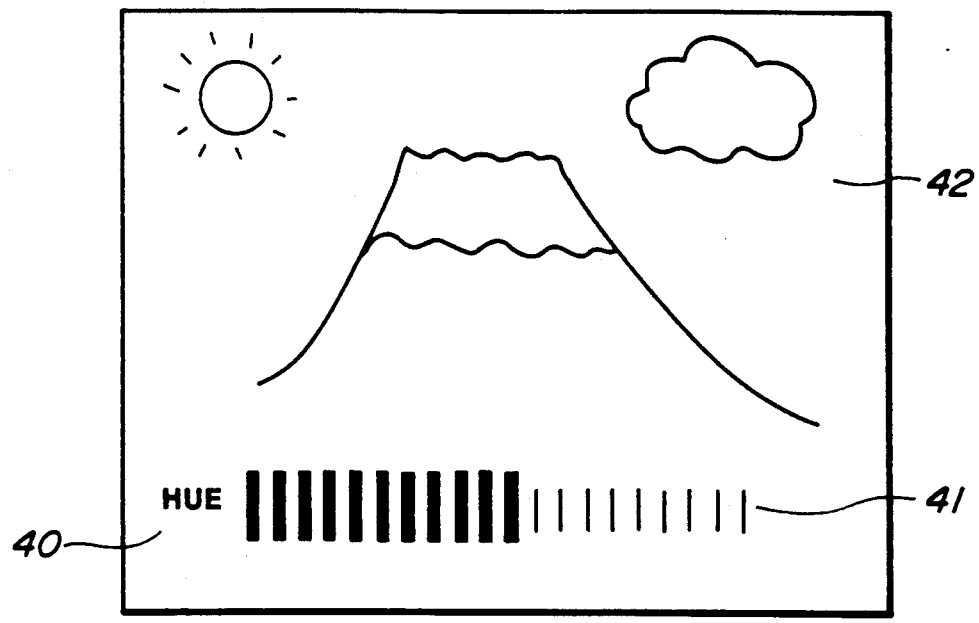
FIG. 1 shows a typical display on the screen of a conventional television receiver at the time of picture quality adjustment.
Figure 2:
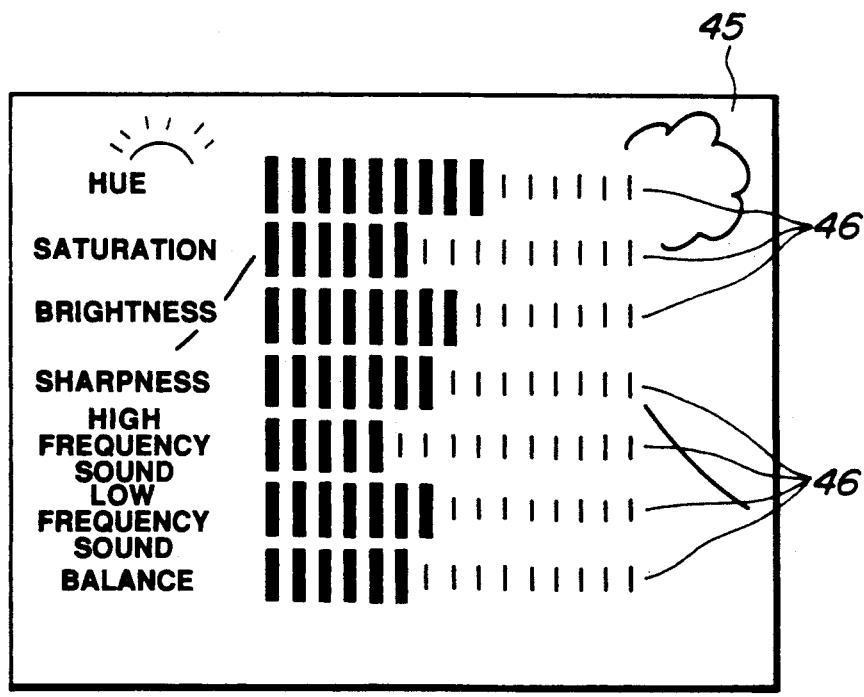
FIG. 2 shows another typical display on the screen of a conventional television receiver at the time of picture quality adjustment.

By referring to the drawings, an illustrative preferred embodiment of the present invention will be explained in detail.

Figure 3:
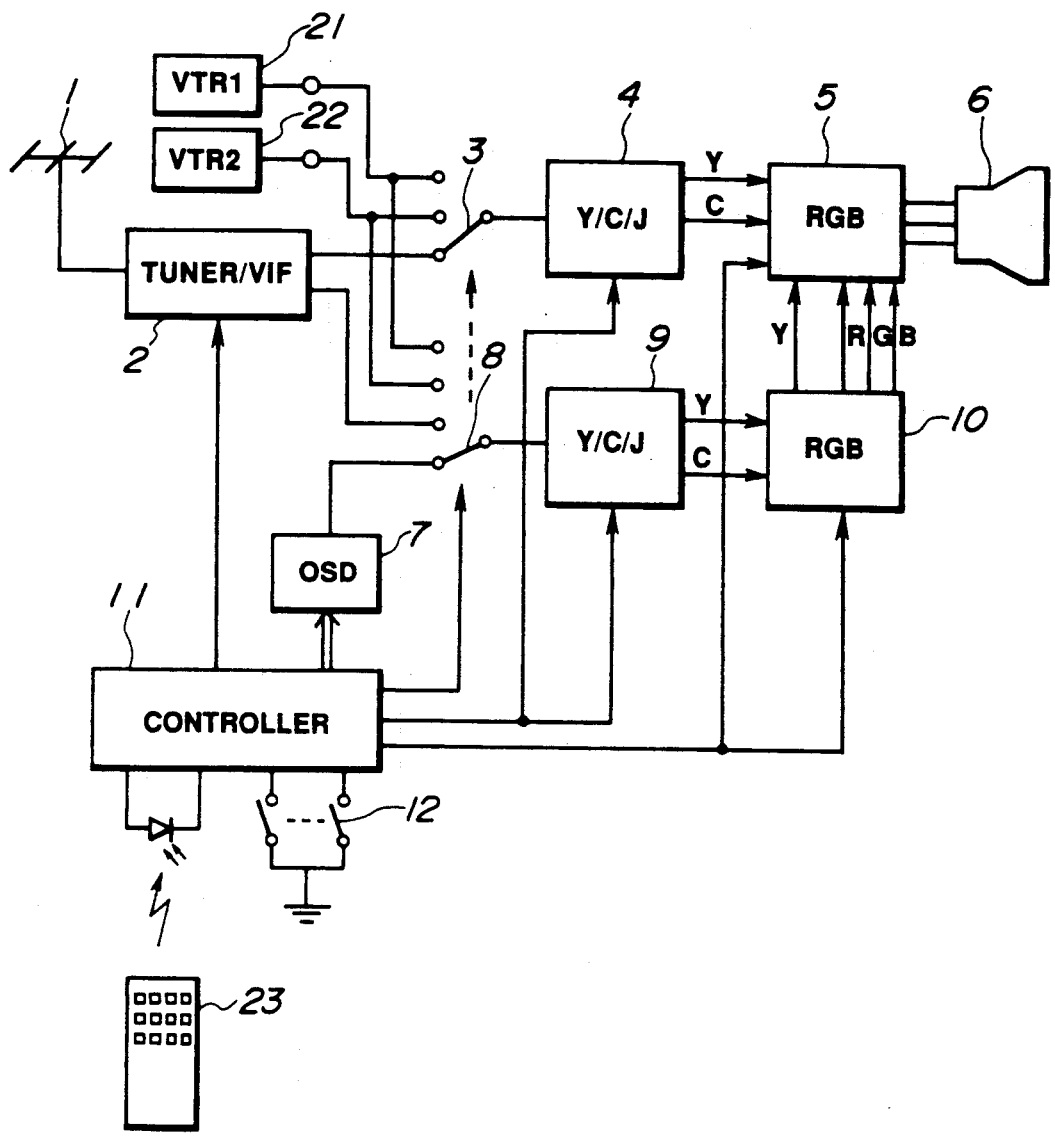
FIG. 3 is a block diagram of a television receiver according to the present invention.

FIG. 3 shows, in a block diagram, a television receiver according to the present invention. In this figure, a tuner/VIF circuit 2 is constituted by an electronically tuned type tuner, an intermediate frequency amplifier circuit, a detector circuit or the like. The tuner/VIF circuit 2 selects and amplifies signals of a desired channel from VHF and UHF signals applied to an antenna 1 by a channel changeover control signal supplied from a controller 11. The circuit 2 then causes the amplified signal to be converted into intermediate frequency signals, which are amplified. From the amplified intermediate frequency signals, the tuner/VIF circuit 2 generates color television signals, that is the luminance signals, carrier chrominance signals, sync signals or the like.

A first changeover switch 3 selects, under control of a controller 11, one of the color television signals from the tuner/VIF circuit 2 and VTRs 21, 22 to supply the selected color television signals to a first video signal processing circuit or Y/C/J circuit 4.

The Y/C/J circuit 4 is constituted by a video amplifier circuit, a color signal reproducing circuit or the like, and functions to amplify the luminance signals of the color television signals from the changeover switch 3 as well as to separate the carrier chrominance signals from the color television signals and to demodulate the color difference signals from the carrier chrominance signals.

A first matrix circuit or RGB circuit 5 is supplied with the luminance signals and the color difference signals from the Y/C/J circuit 4 to generate three prime color signals or G, R and B signals. For displaying three prime color signals from a second matrix circuit 10 as later described in a subsidiary screen area 16 provided in a portion of or adjacent to a main screen area 15 in which is displayed the image by the input video signals from a color picture tube 6, the matrix circuit 5 supplies the prime color signals generated in the matrix circuit 5 and the prime color signals from the matrix circuit 10 simultaneously to the color picture tube 6.

Figure 4:
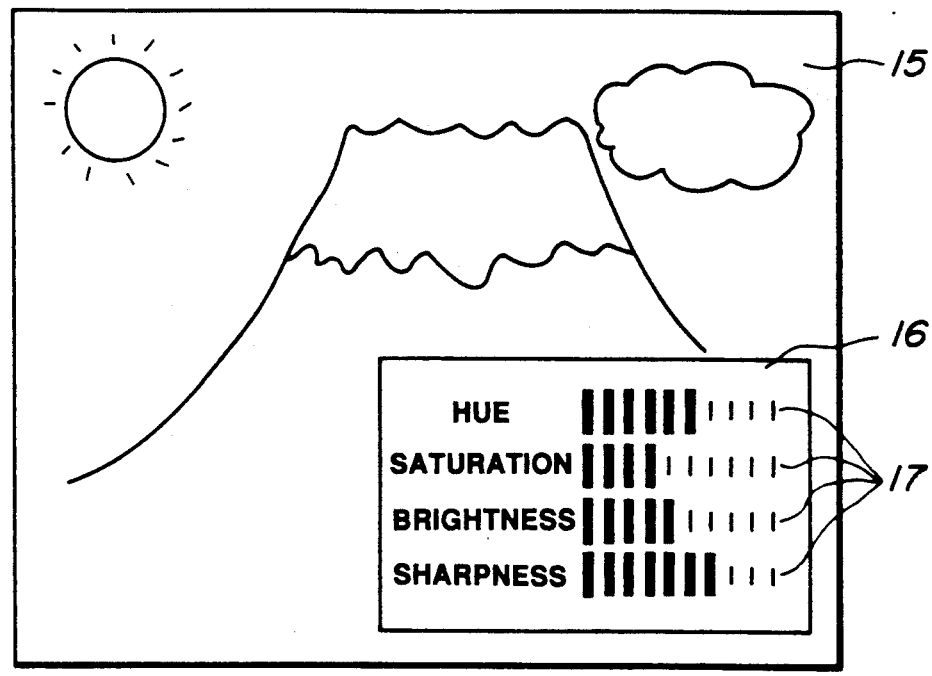
FIG. 4 shows a typical display on the television receiver shown in FIG. 3.

A character signal generating circuit, that is an on-screen display circuit 7, operates on the basis of the control data from controller 11 to generate character signals to be displayed on the subsidiary screen area 16 shown in FIG. 4.

A second changeover switch 8 operates under control of the controller 11 to select one of the color television signals supplied from the tuner/VIF circuit 2, VTRs 21 and 22 or the character signal generator 7 and to supply the selected color television signals to a second video signal processing circuit or Y/C/J circuit 9.

The second Y/C/J circuit 9 is constituted by, for example, an image amplifier and a color signal reproducing circuit, and operates to amplify luminance signals of the color television signals from the changeover switch 8 as well as to separate the carrier chrominance signals from the color television signals and to demodulate the color difference signals from the carrier chrominance signals.

The second matrix circuit 10 is supplied with the luminance signals and the color difference signals from the image signal processing circuit 9 to generate three prime color signals, which are supplied to the first matrix circuit 5.

The controller 11 detects the position of the switches for selecting the input color television signals, the display on the subsidiary screen area 16, and the channel. The controller 11 also detects the setting values of the sound volume, color hue, color saturation, brightness or luminance, sharpness, high frequency sounds, low frequency sounds and the balance of the sound volumes between the left and right speakers, as set on operating switches, not shown, of the commander 23 or on operating switches 12 on the front side of the television receiver. For each of the parameters to be adjusted or set, the controller 11 transmits the corresponding control signals to first and second changeover switches 3 and 8, tuner/VIF circuit 2, first and second video signal processing circuits 4 and 9 and first and second matrix circuits 5 and 10, while transmitting control data for displaying the level bars 17 shown in FIG. 4 on the subsidiary screen area 16 as well as control data for displaying messages for instructing the operator in performing the various functions of the television receiver on the subsidiary screen area 16, to the character signal generating circuit 7, as an aid or guide for the adjustment operations.

In this manner, the color video signals such as the input video signals of the channel received by the antenna 1, are displayed on the main screen area 15 of a color picture tube 6, while the character signals from the character signal generating circuit 7 are occasionally supplied as control data through second matrix 10, to the first matrix circuit 5 for display on the subsidiary screen area 16 of the color picture tube 6, as shown for example in FIG. 4. In this manner, in accordance with the present invention, display control means by which the subsidiary screen area 16 is provided as a portion of or adjacent to the main screen area 15 is constituted by a first matrix circuit 5 and a controller 11, and a character signal generating circuit 7 functioning as character signal generating means for generating the character signals on the basis of the control data.

Figure 5:
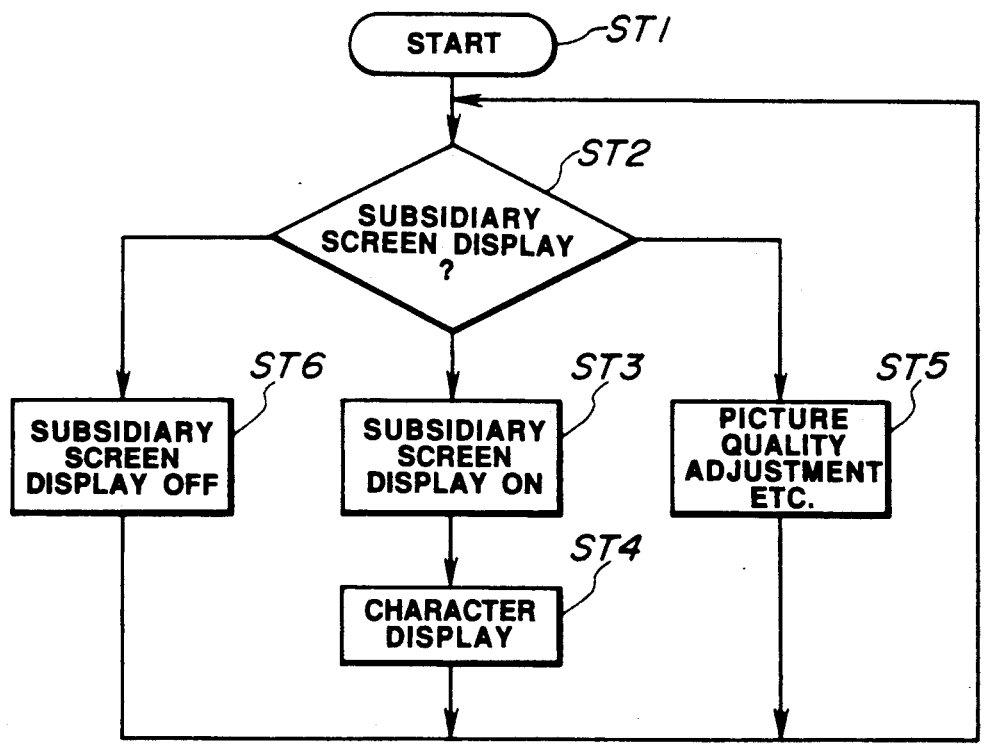
FIG. 5 is a flow chart for illustrating the operation for picture quality adjustment with the aid of a commander.
Figure 6:
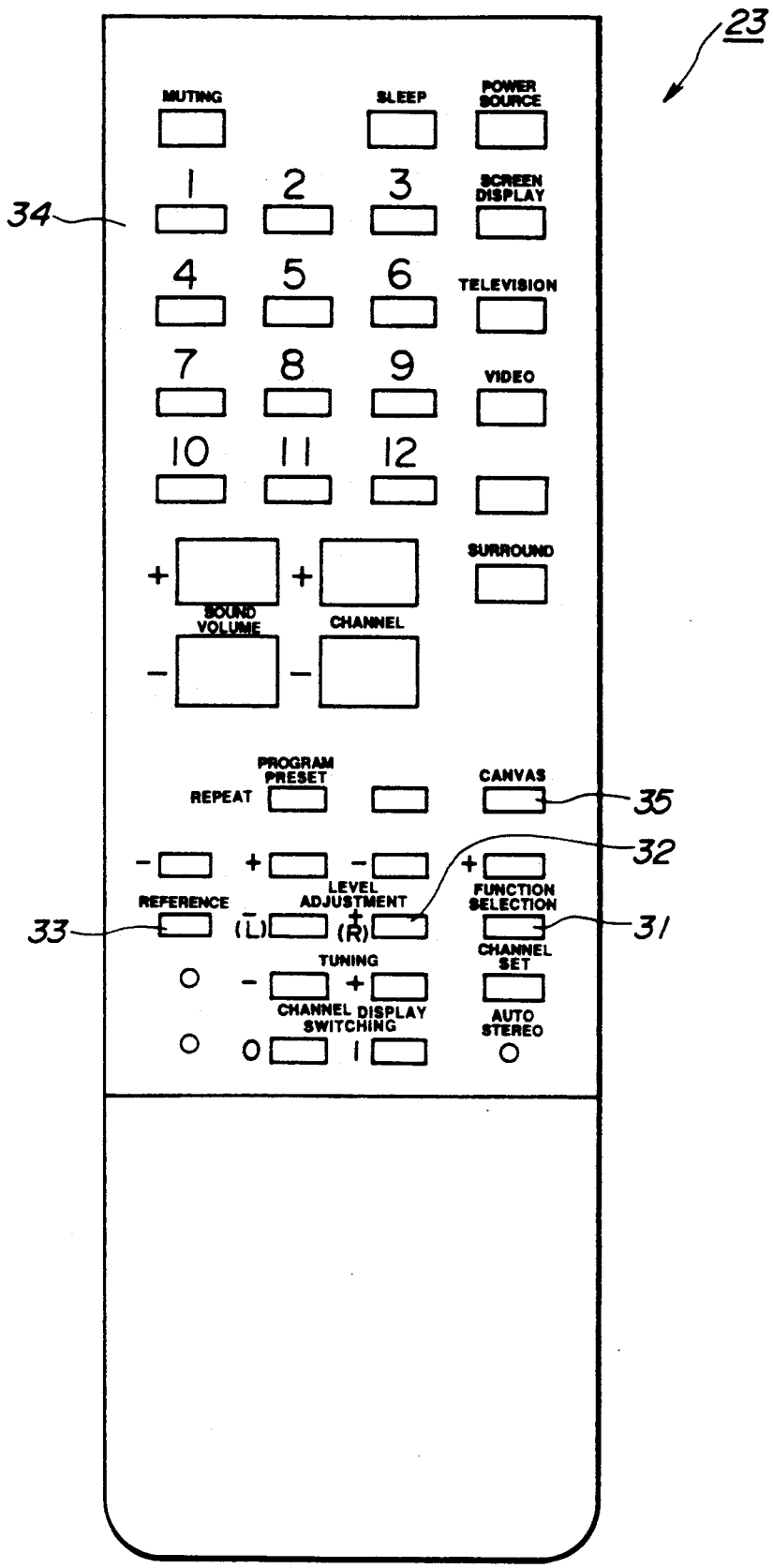
FIG. 6 is a diagrammatic plan view of the commander.

Referring now to the flow chart shown in FIG. 5, the operation of adjusting the picture quality with the aid of the commander 23 is explained FIG. 6 diagrammatically shows the operating section of the commander 23 on an enlarged scale.

At step ST1, the operator presses a function selection key 31 shown in FIG. 6. The controller 11 receives the control signal from commander 23 and proceeds to step ST2.

At step ST2, the controller 11 decodes the control signals from commander 23. If, as a result of decoding it becomes necessary to create the subsidiary screen area 16 in connection with the picture quality or sound quality adjustment mode or the program preset mode, the controller 11 proceeds to step ST3. If the operator performs operations to adjust the picture or sound quality, for example, for corresponding adjustment mode, the controller 11 proceeds to step ST5. If the operator actuated a numerical key 34 for channel switching, or if the operator failed to actuate the commander 23 for a predetermined time interval, the controller 11 proceeds to step ST6.

At step ST3, the controller 11 controls the second changeover switch 8 to select character signals from the character signal generating circuit 7, while setting the matrix circuit 10 into operation. In addition, for displaying the control data in the subsidiary screen area 16, the controller 11 controls the first matrix circuit 5 to turn on the display on the subsidiary screen area 16 so that image of the prime color signals generated in the first matrix circuit 5 and image of the prime color signals from the second matrix circuit 10 are displayed simultaneously on the viewing screen. The controller 11 then proceeds to step ST4.

At step ST4, the controller 11 controls the character signal generating circuit 7 to display the characters of COLOR HUE, SATURATION, BRIGHTNESS and SHARPNESS as adjustment parameters, and the current setting values for these parameters, in the form of level bars 17, on the subsidiary screen area 16, as a guide for picture quality adjustment, as shown for example in FIG. 4: The operator operates the commander 23, until the desired picture quality is reached, while he or she monitors the actual picture quality on the main screen area 15 with respect to the level bars 17 displayed on the subsidiary screen area 16. When the operation is complete, the controller 11 reverts to step ST2.

More specifically, at step ST2, after the subsidiary screen area display is turned on, the operator again presses the function selection key 31 for adjusting a parameter, such as the brightness, for example, a number of times. The controller 11 decodes the control signals generated from the commander 23 corresponding to the chosen operation and proceeds to step ST5 for setting a cursor to a column corresponding to the chosen parameter before the controller 11 reverts to step ST2.

Then, at step ST2, the operator actuates a level adjustment (+) key 32 on the commander 23 for adjusting the chosen parameters, for example enhancing the brightness on the screen. The controller 11 detects the actuation and proceeds to step ST5.

At step ST5, the controller 11 transmits control signals for adjusting the brightness, for example, on the screen to the first and second video signal processing circuits 4 and 9, while transmitting control signals for adjusting the level bar indication for brightness by one step to the character signal generating circuit 7. As a result, the brightness of the picture on the screen of the television receiver is enhanced by one step while the level bar indication for the brightness setting on the subsidiary screen area 16 is correspondingly increased by one step. If the operator actuates a level adjustment reference key 33 on the commander 23 for simultaneously setting the values for color hue, saturation, brightness and sharpness to their respective predetermined reference values, the controller 11 detects such actuation and transmits control signals for setting the picture quality, such as hue, saturation, brightness and sharpness, to their respective predetermined reference values, to the video signal processing circuits 4 and 9. The controller 11 also transmits control information for causing the level bars 17 for the various picture quality parameters to indicate the predetermined reference value to the character signal generating circuit 7. As a result, the picture quality of the picture displayed on the screen of the television receiver 6 is set to a reference value, while the picture quality parameters, such as hue, saturation, brightness and sharpness, are displayed on the subsidiary screen area 16, and set at the reference values, indicated by the row of bars 17. This completes the picture quality adjustment operation. If necessary, the level bars indicating the current setting level for sound quality are displayed on the subsidiary screen area 16 to and in performing the sound quality adjustment operation accordingly. The controller then reverts to step ST2.

At step ST2, if the operator actuated a numerical key 34 for channel switching, for example, or if the operator failed to operate the commander 23 for a predetermined time interval, the controller 11 detects it and proceeds to step ST6.

At step ST6, the controller 11 turns off the display on the subsidiary screen area 16 and reverts to step ST2 to wait for arrival of the control signal from commander 23. The above described sequence of operations also may be performed using the operating switch 12 on the front surface of the television receiver. In this manner, the various kinds of information necessary for picture quality adjustment may be displayed on the subsidiary screen area 16, without obstructing the main screen area, 15 of the television receiver, thereby facilitating the adjustment operation, such as the picture quality adjustment operation.

A typical display sequence on the subsidiary screen area 16 in the program presetting function, enabling a desired broadcasting program to be viewed every day automatically, is hereinafter explained.

When the operator presses a CANVAS key 35 on the commander 23 twice, and the controller 11 detects the pressing, the controller 11 displays, responsive to the operator's operations, the following messages on the subsidiary screen area 16:

| Display | Operation |
| --- | --- |
| (i) "Present Program" | |
| (ii) "Enter Start Time" | Enter "7.00" |
| (iii) "Enter End Time" | Enter "8.00" |
| (iv) "Enter Channel Number" | Enter "1" |
| (v) "Start Time: 7:00 | Press CANVAS key 35 |
| End Time: 8:00 | |
| Channel: 1(NHK) | |
| Confirm: Press CANVAS" | |

By proceeding with the operation in accordance with the messages displayed on the subsidiary screen area 16 in this manner, programs may easily be preset.

As described in the foregoing, by generating character signals on the basis of the control information from the controller 11, converting the character signals in the second video signal processing circuit 9 and the second matrix circuit 10 into prime color signals and by displaying the control information on the subsidiary screen region 16 by supplying the control data simultaneously with the input video signals to the circuit 5, a variety of control data may be displayed on the subsidiary screen area 16 without obstructing the main screen area 15. Also the current setting levels of a plurality of parameters of the picture quality, for example, may be displayed simultaneously, and adjustment may be made for these parameters while the setting levels for the parameters and the picture quality of the image on the main picture area 15 are simultaneously monitored on the main screen area 15. In addition, the adjustment operation by the operator may be facilitated by the messages displayed on the subsidiary screen area 16.

It is also possible with the television receiver of the present invention to display a variety of control data, such as messages, on the subsidiary screen area 16. Adjusting the direction of the antenna may also be facilitated by displaying the antenna reception level. The space analyzer display, time display, display of the operational sequence for time setting or display of the operational sequence for program presetting and recording on VTR, may also be provided on the subsidiary screen area 16.

Although the broadcast program or the video signals from VTRs 21 or 22 may be displayed on the subsidiary screen area 16 by means of switch 8, only the control data may be adapted to be displayed on the subsidiary screen area 16.

The present invention may also be applied to a high definition television receiver, that is a so-called Hi-Vision television receiver.

What is claimed is:

1. A television receiver having a main screen area for displaying a primary picture image generated by input video signals, comprising:
    a remote commander for generating user commands and having a plurality of keys actuable by a user of the television receiver, said keys corresponding to operating parameters of the television receiver commandable by the user;
    a controller for generating control data in response to said user commands from said remote commander;
    display control means for providing a generally rectangular subsidiary screen area in a portion of said main screen area for displaying a secondary picture image different than said primary picture image;
    a first video signal processing circuit including a first color matrix circuit for processing said input video signals for display as a primary picture image in said main screen area;
    character signal generating means for generating character signals on the basis of said control data; and
    a second video signal processing circuit including a second color matrix circuit for selectively processing one of said character signals or said input video signals for display in said subsidiary screen area of said main screen area, said input video signals being processed for display as said secondary picture image in said subsidiary screen area,
    wherein said character signals from said character signal generating means or said input video signals comprise said secondary image and are supplied to said display control means for displaying said control data or said input video signals on said subsidiary screen area, and wherein said secondary image does not extend beyond the boundaries of said subsidiary screen area.

2. A television receiver according to claim 1 wherein said control data comprise various data for adjusting the quality of said primary image.

3. A television receiver according to claim 2 wherein the character signals for displaying the control data are displayed as level bars.

4. A television receiver according to claim 1 wherein said control data comprise an operational sequence for presetting display parameters of a broadcast program.

5. A television receiver according to claim 1 wherein said control data comprise receiver antenna reception level data.

6. A television receiver according to claim 1, further comprising a switch for supplying secondary image signals to said subsidiary screen area, said switch adapted for switching between a signal source for broadcast programs and said character signal generating means.

* * * * *